(No Model.)

T. H. MEHRING.
BEER FAUCET ATTACHMENT.

No. 498,357. Patented May 30, 1893.

Witnesses
Wm. F. Doyle.
D. P. Wolhaupter.

Inventor
Theodore H. Mehring.

By his Attorneys,
C. A. Snow & Co.

UNITED STATES PATENT OFFICE.

THEODORE H. MEHRING, OF YANKTON, SOUTH DAKOTA.

BEER-FAUCET ATTACHMENT.

SPECIFICATION forming part of Letters Patent No. 498,357, dated May 30, 1893.

Application filed December 14, 1892. Serial No. 455,187. (No model.)

*To all whom it may concern:*

Be it known that I, THEODORE H. MEHRING, a citizen of the United States, residing at Yankton, in the county of Yankton and State of South Dakota, have invented a new and useful Beer-Faucet Attachment, of which the following is a specification.

This invention relates to faucet attachments; and it has for its object to provide an improved attachment for beer faucets particularly, which shall serve in the capacity of an efficient packing for the bung-hole after the bung has been knocked in by the faucet.

To this end the invention primarily contemplates a simple and inexpensive packing attachment for beer faucets or faucets used in barrels or kegs containing effervescent drinks, which shall serve to prevent the escape of the gas or liquid where the bung holes are not round or have worn out.

With these and other objects in view which will readily appear as the nature of the invention is better understood, the same consists in the novel construction, combination and arrangement of parts, hereinafter more fully described, illustrated and claimed.

Figure 1:
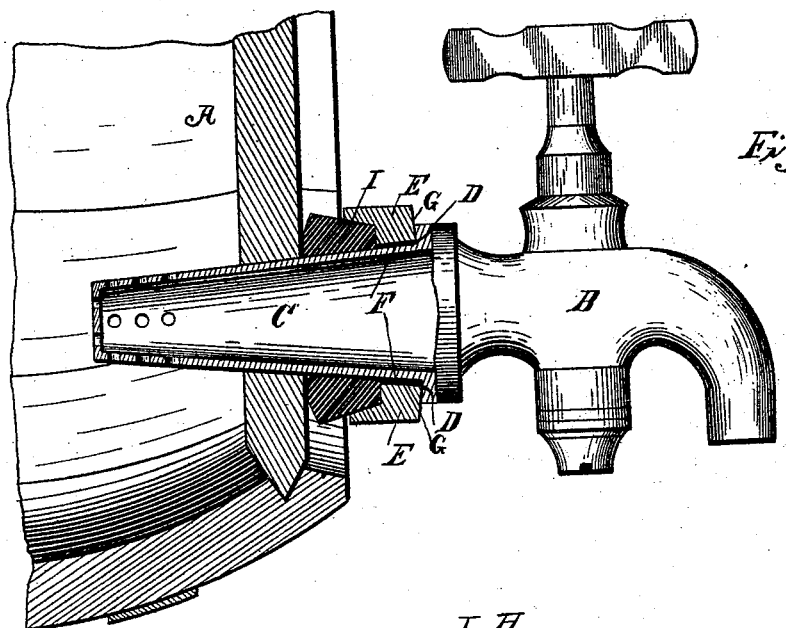
Figure 2:
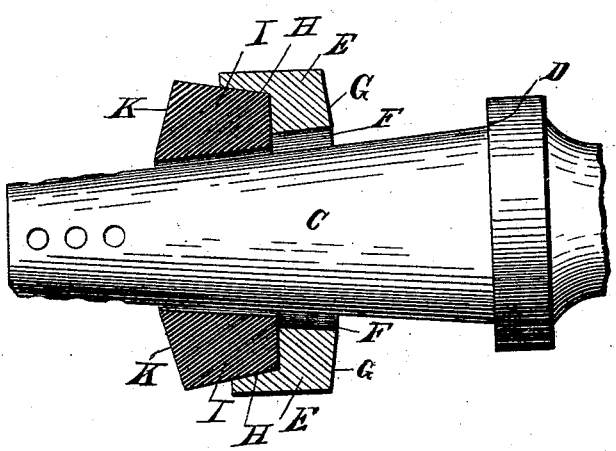
Figures 3, 4:
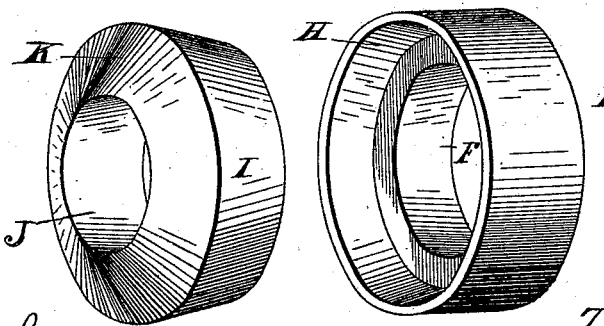

In the accompanying drawings:—Figure 1 is an enlarged sectional view of one end of a beer barrel showing my attachment in position when the faucet is in the head of the barrel. Fig. 2 is an enlarged detail sectional view of the attachment. Figs. 3 and 4 are details in perspective of the follower and packing ring, respectively.

Referring to the accompanying drawings, A represents the head of a beer keg or barrel in which an ordinary beer faucet B has been driven in position. The faucet B is provided with a tapered stem C, that is adapted to be wedged in the bung hole and at the inner end of which is formed the inwardly beveled shoulder D. Arranged to loosely fit over the tapered stem C, of the faucet is the cup follower E, of the packing attachment. The cup follower E, is provided with an enlarged central opening F, that allows the follower to be placed over the stem and against the shoulder thereof, and the said follower E is further provided at one side with an outwardly beveled face G, which snugly fits the beveled shoulder D, of the faucet. In the opposite side of the follower E, is formed a tapered seat or recess H, which is designed to receive the inner edge or side of the tapered packing ring I. The tapered packing ring I, is exteriorly tapered so that the inner edge thereof will snugly fit in the tapered seat or recess H, of the follower E. The said packing ring I, is of a width so that after insertion into the seat or recess of the follower, the outer edge thereof projects beyond the follower so as to leave an exposed contact face for the head of the keg or barrel, and said widened ring is provided with a tapered bore or opening J, of less diameter than the bore or opening of the follower or metallic ring, and is designed to wedge tightly onto the tapered stem of the faucet. The outer exposed face or side of the packing ring, which is of rubber or similar flexible material, is outwardly beveled as at K, so as to insure a close contact of the same with the head of the keg or barrel around the bung hole into which the faucet has been driven.

Now it will be readily seen that after the packing attachment has been placed onto the tapered stem of the faucet, the exterior edge of the flexible ring will be in a line flush with the exterior of the metal ring or follower and when the faucet has been driven into the bung hole, the outer projecting edge of the tapered bore of the packing ring will be forced into any openings or crevices which surround the faucet stem in the bung hole, and said packing ring being forced tightly against the head of the barrel will serve to make the closure perfectly gas and liquid tight.

From the foregoing it is thought that the construction and many advantages of the herein-described attachment will be apparent to those skilled in the art.

Having thus described my invention, what I claim, and desire to secure by Letters Patent, is—

1. The combination of a faucet having a tapered stem and an inwardly beveled shoulder at the inner terminal of said stem, a metallic follower ring mounted loosely on the stem and having an outwardly beveled face at one side adapted to fit the beveled shoulder of the faucet, and a seat or recess at the other side, and a widened packing ring adapted to tightly fit the tapered stem and the seat or recess of said follower ring, substantially as set forth.

2. The combination of a faucet having a tapered stem and an inwardly beveled shoulder at the inner terminal of said stem, a metallic follower ring mounted loosely on the stem and provided at one side with an outwardly beveled face adapted to fit the beveled shoulder of the faucet, and a tapered seat or recess in the opposite side thereof, an exteriorly tapered widened packing ring having one edge thereof fitting the tapered seat or recess of the follower and having a tapered bore or opening of less diameter than the bore of the follower to wedge on the tapered stem, and an outwardly beveled contact face adapted to form a closure at the bung hole, substantially as set forth.

3. In a device of the class described, the combination of a metallic follower ring adapted to loosely embrace the tapered stem of a faucet and provided at one side with a tapered seat or recess, and an exteriorly tapered widened packing ring adapted to have one edge thereof fit into the tapered seat or recess of the follower ring, and provided with a tapered bore and an outwardly beveled contact face, substantially as set forth.

In testimony that I claim the foregoing as my own I have hereto affixed my signature in the presence of two witnesses.

THEODORE H. MEHRING.

Witnesses:
CHRISTIAN HAMEISTER,
JACOB SEIBERT.